Feb. 20, 1968 J. A. BURNS 3,369,769
ROTARY-INERTIA LOCKING SEAT BELT RETRACTOR
Filed April 22, 1966 2 Sheets-Sheet 1
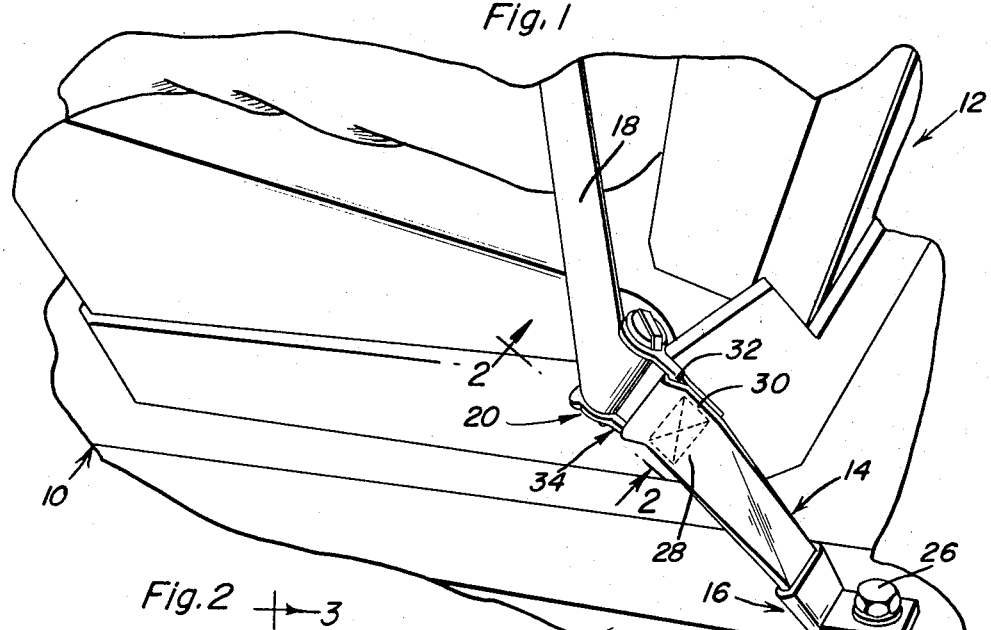
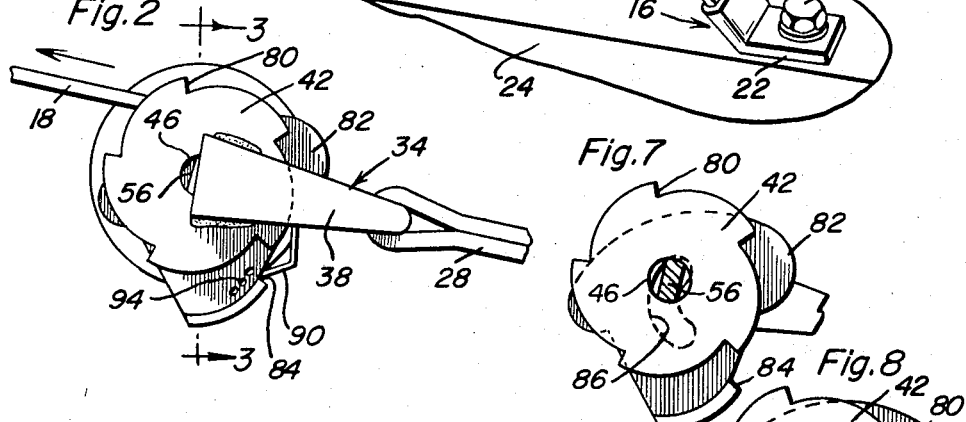
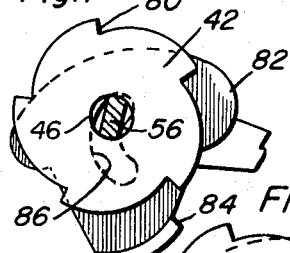
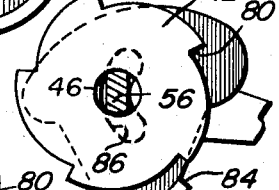
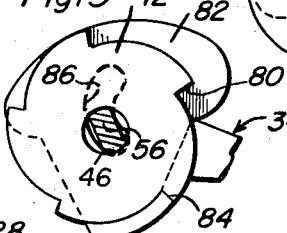
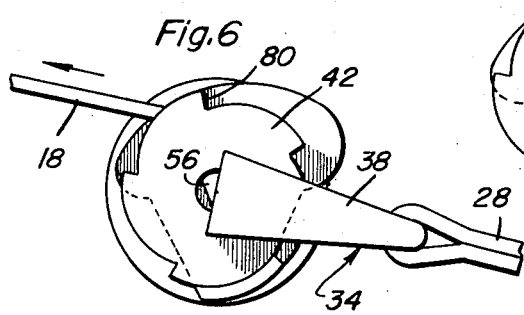
Joel A. Burns
INVENTOR.

Feb. 20, 1968  J. A. BURNS  3,369,769
ROTARY-INERTIA LOCKING SEAT BELT RETRACTOR
Filed April 22, 1966  2 Sheets-Sheet 2
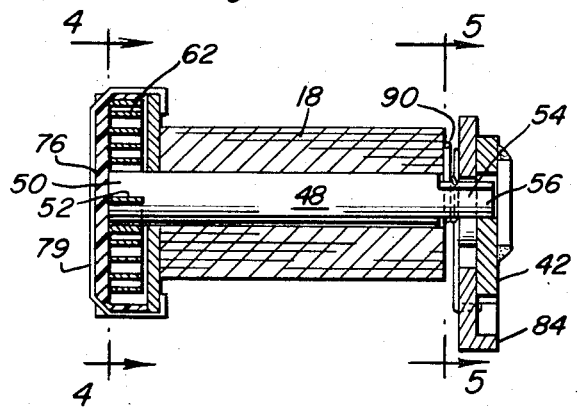
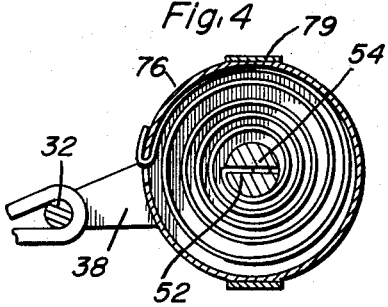
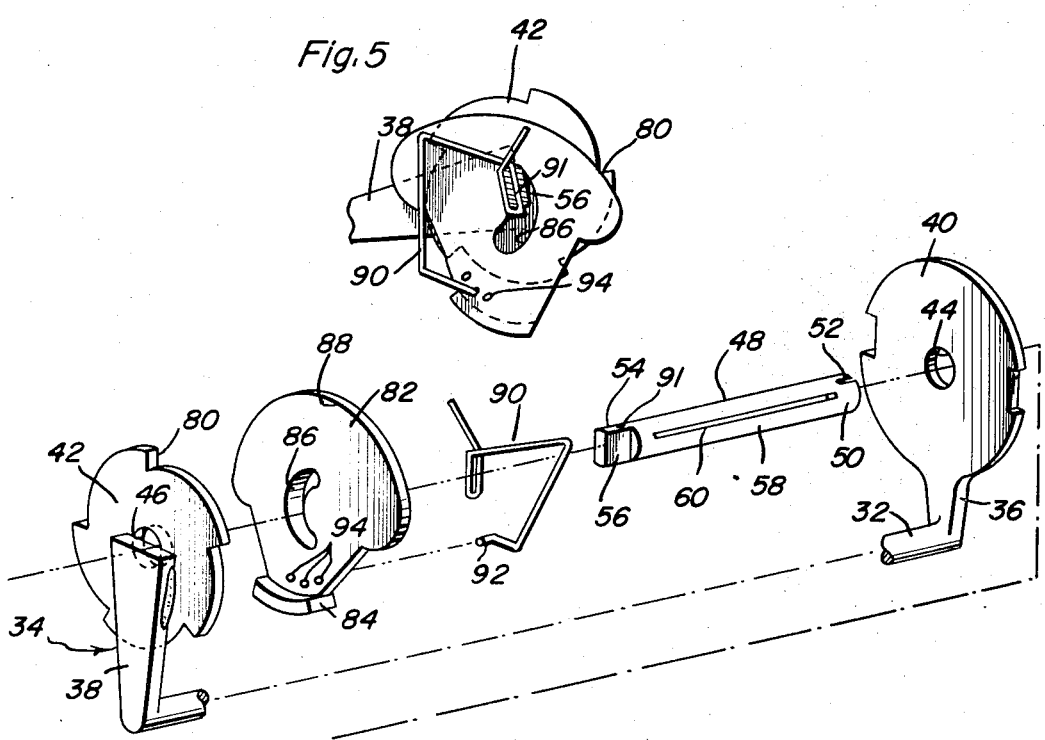
Fig. 10
Joel A. Burns
INVENTOR.
BY
Attorneys > United States Patent Office 3,369,769
Patented Feb. 20, 1968

3,369,769
ROTARY-INERTIA LOCKING SEAT
BELT RETRACTOR
Joel A. Burns, 3717 Del Mar Drive NE.,
Albuquerque, N. Mex. 87111
Filed Apr. 22, 1966, Ser. No. 544,578
10 Claims. (Cl. 242—107.4)

ABSTRACT OF THE DISCLOSURE

A rotary lock assembly including a base provided with first abutment means and a shaft journalled from said base and having a single movable component defining second abutment means mounted on and supported from the shaft for rotation therewith and limited shifting relative thereto between first and second positions with a portion of the component positioned out of and in position, respectively, for engagement with the first abutment means of the base to lock the shaft against rotation relative to the base, the shaft and movable component including coacting cam surfaces engageable with each other and operative, in response to torque above a predetermined value being applied to the component through the shaft in one direction of rotation thereof, to shift the component from the first position toward the second position.

---

This invention relates to a novel and useful seat belt retracting and locking mechanism and more specifically to a retracting and locking mechanism for a spring urged seat belt winding member operative in a manner to enable free winding of the associated seat belt at all times by spring action and enabling a fully wound seat belt section to be freely unwound therefrom as long as rotation of the winding member in a direction to unwind the seat belt section therefrom is not above a predetermined speed or rapidly accelerated.

The seat belt retracting and locking mechanism of the instant invention is operative, upon high rotational speed or rapid acceleration of rotational speed of the winding member in a direction to unwind the seat belt section therefrom, to lock the winding member against further rotation in the direction unwinding the seat belt section therefrom. Further, after the winding member has been locked against rotation to unwind the seat belt by high speed rotation or rapid acceleration of rotation of the winding member, the retracting and locking mechanism of the instant invention includes means by which further unwinding of the associated seat belt section may be accomplished after the winding member has been slightly rotated in a direction to wind the associated seat belt section thereon as long as the subsequent rotation of the winding member does not involve rapid rotation or acceleration of rotation thereof.

The automatic seat belt retracting and locking mechanism of the instant invention is constructed in a manner whereby it is substantially foolproof and will be fully operative to lock the seat belt section associated therewith against further extension as soon as rotation of the winding member on which the seat belt section is partially wound is rapidly rotated or rapidly accelerated in rotation in a direction to unwind the seat belt section therefrom.

The main object of this invention is to provide a seat belt retractor and automatic locking mechanism therefor which may be readily adapted for use in substantially all existing passenger vehicles and which will lend itself to being mounted in various passenger vehicles in many of the various conventional ways presently used.

Another object of this invention is to provide a seat belt retractor including a ratchet-type one-way clutch for preventing protraction of the associated seat belt section beyond that which is accomplished by rotation of the associated winding member through but a small arc, when rotation of the winding member through this small arc is rapidly accelerated such as would be the case should the associated motor vehicle be suddenly decelerated by a crash and the person wearing the associated seat belt be rapidly thrown forward.

A further object of this invention is to provide a seat belt retractor in accordance with the preceding objects and including structural features which will enable silent retraction of the associated seat belt section from a fully protracted position even though a ratchet-type one-way lock mechanism is employed.

A final object of this invention to be specifically enumerated herein is to provide a seat belt retractor with automatic locking means and constructed in accordance with the preceding objects which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a passenger seat construction of a conventional form of motor vehicle shown with the associated seat belt assembly utilizing the seat belt retractor and automatic locking means of the instant invention;

FIGURE 2 is an enlarged side elevational view of the seat belt retractor illustrated with the end housing thereof removed;

FIGURE 3 is a vertical sectional view taken substantially upon a plane indicated by the section line 3—3 of FIGURE 2;

FIGURE 4 is a sectional view taken substantially upon a plane indicated by the section line 4—4 of FIGURE 3;

FIGURE 5 is a sectional view taken substantially upon the plane indicated by the section line 5—5 of FIGURE 3;

FIGURE 6 is an elevational view similar to that of FIGURE 2 but illustrating the parts of the retractor in operation locking the winding member thereof against further protraction of the associated seat belt section;

FIGURES 7–9 are diagrammatical views similar to FIGURES 2 and 6 and illustrating the progressive movement of the locking member of the retractor during its movement from the position thereof illustrated in FIGURE 2 of the drawings to a position illustrated in FIGURE 6 of the drawings in response to rapid rotation or rapid acceleration of rotation of the winding member of the retractor in a direction to protract the associated seat belt section; and FIGURE 10 is a fragmentary exploded perspective view of the seat belt retractor of the instant invention.

Referring now more specifically to the drawings the numeral 10 generally designates a conventional form of motor vehicle having a passenger seat construction generally referred to by the reference numeral 12 disposed therein and alongside of which a seat belt assembly generally referred to by the reference numeral 14 is disposed. The seat belt assembly 14 includes an anchor assembly generally referred to by the reference numeral 16 and an extendable seat belt section 18 at least partially wound upon the seat belt protractor assembly of the instant invention which is generally referred to by the reference numeral 20 and suitably anchored to the anchor assembly 16.

The anchor assembly 16 includes an anchor bracket 22 suitably secured to the floor 24 of the vehicle 10 by means of a suitable fastener 26 and a short length of flexible belting 28 is secured at one end to and extends from the anchor bracket 22 and has its free end portion 30 secured to a cross member 32 of the main frame 34 of the seat belt retractor assembly of the instant invention.

The main frame 34 of the assembly 20 includes a pair of generally parallel opposite side portions 36 and 38 which are interconnected by means of the cross member 32 and which include disk-like end portions 40 and 42 centrally apertured as at 44 and 46, respectively.

A winding member in the form of a shaft 48 has its opposite end portions journaled in the apertures 44 and 46 and it may be seen that one end portion 50 of the shaft 48 is provided with a diametric endwise opening slot 52, the remote end portion 54 of the shaft 48 includes a diametrically flattened portion 56, and the central portion 58 of the shaft 48 is provided with a diametric slot 60 closed at its opposite ends.

The section 18 has one end thereof secured in the slot 60 and a coil spring 62 has a laterally directed tab portion 64 of its innermost convolution 66 anchored in the slot 52, the free end of the outermost convolution 68 of the spring 62 being hooked as at 70 and engaged with a slot 72 formed in the cylindrical wall portion 74 of an end cap 76 secured to the outer surface of the disk-shaped end portion 40 by means of a generally C-shaped spring clip 79 and enclosing the spring 62 and the adjacent end of the shaft 48, the coil spring 62 yieldingly urging the shaft 48 to rotate in a direction winding the section 18 thereon.

The disk-shaped end portion 42 on the side portion 38 is provided with circumferentially spaced ratchet teeth 80 on its outer peripheral edge portion and a ratchet dog plate 82 including a laterally projecting dog element 84 is mounted on the shaft 48 inwardly of the disk-shaped end portion 42 with the flattened end portion 56 of the shaft 48 slidably received in an arcuate slot 86 formed in the plate 82. The plate 82 is eccentrically weighted relative to the slot so that the side 88 remote from the dog element 84 is heavier than the side thereof on which the dog element 84 is disposed.

An elongated and angularly bent spring 90 has one end portion passed through a suitable diametric bore 91 formed through the shaft 48 and is therefore secured to the shaft 48 for rotation therewith. The other end portion of the spring 90 includes a laterally directed terminal end 92 which is selectively passed through one of the small diameter bores 94 formed in the light side of the plate 82 adjacent the dog element 84.

With attention now invited to FIGURES 2 and 6, it is to be noted that the spring 90 normally urges the light side of the plate 82 on which the dog element 84 is disposed radially outwardly of the adjacent peripheral portions of the disk-shaped end portion 42, from a position similar to that illustrated in FIGURE 6 toward a position similar to that illustrated in FIGURE 2. Accordingly, it may be seen that the plate 82 is disengaged from the ratchet teeth 80 and therefore that the section 18 may be protracted, at least slowly, in the direction of the arrow in FIGURE 2 of the drawings. However, inasmuch as the side of the plate 82 remote from the dog element 84 is heavier than the dog element side of the plate 82, rapid rotation of the plate 82 with the shaft 48 during rapid protraction of the section 18 will cause centrifugal forces to act upon the plate 82 and the latter to be shifted from the position illustrated in FIGURE 2 of the drawings to the position illustrated in FIGURE 6 of the drawings with the dog element 84 engaged with one of the ratchet teeth 80 thereby locking the plate 82, and thus the shaft 48, against rotation in a direction effecting further protraction of the section 18.

However, with attention now invited more specifically to FIGURES 7–9, the retractor assembly 20 is operative to lock the seat belt section 18 against protraction independently of the eccentric weighting of the plate 82 thereby enabling the eccentric weighting of the plate 82 to act as a back up or back stop safety factor even though the same is not necessary in substantially all operating conditions. The plate 82, independent of its eccentric weighting, represents mass tending, by inertia, to stay at rest whenever the shaft 48 is at rest. However, rapid protraction of the section 18, such as would occur during a collision, results in the flattened end portion 56 of the shaft 48 being rapidly accelerated in counter-clockwise rotation as illustrated in FIGURES 7–9. This rapid acceleration enables the flattened end portion 56 to cam its way through the slot 86 so as to in turn cam the plate 82 in a direction shifting the dog element side thereof radially inwardly until the dog element 84 engages the ratchet teeth 80. In actual practice, it has been found that rapid acceleration of the shaft 48 from a rest position such as that illustrated in FIGURE 7 of the drawings will cause movement of the plate 82 generally radially relative to the shaft 48 by the camming action of the flattened end portion 56 on the sides of the plate 82 defining the slot 86 and move the plate 82 through the sequential positions illustrated in FIGURES 8 and 9 of the drawings. Thus, it may be seen that the shaft 48 is permitted to rotate somewhat less than 45° before the dog element 84 is fully seated in engagement with the ratchet teeth 80. The camming action of the flattened end portion 56 of the shaft 48 on the sides of the slot 86 is accomplished even against the biasing action of the spring 90 and substantially completely independently of the eccentric weighting of the plate 82. In fact, the camming action of the flattened end portion 56 on the plate 82 is substantially the same even when the plate 82 is not eccentrically weighted and, further, similar when the dog element side of the plate 82 is the heavier side thereof.

It should also be noted herein that after the dog element 84 on the plate 82 has fully engaged the ratchet teeth 80 in the manner illustrated in FIGURE 9 of the drawings, further protraction of the belt section 18 may be accomplished only after at least a small quantity of the section 18 has been wound back upon the shaft 48, such as would be the case if the shaft 48 were rotated from the position illustrated in FIGURE 9 of the drawings to the position illustrated in FIGURE 7 of the drawings. Of course, should the section 18 be subsequently rapidly protracted, the shaft 48 would merely move again from the position illustrated in FIGURE 7 of the drawing to the position illustrated in FIGURE 9 of the drawings before the dog element 84 was fully seated again with the ratchet teeth 80. Thus, the seat belt locking and retracting mechanism of the instant invention is fully operative during those types of collisions which have a tendency to rapidly throw an associated passenger back and forth in his seat.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a base, a winding member journaled from said base, said base and winding member including coacting lock means, said coacting lock means including first abutment means carried by said base and second abutment means carried by said winding member for rotation therewith and for limited shifting transversely of the axis of rotation of the winding member relative to the latter and between first and second positions out of and in position for engagement with said first abutment means to positively lock said winding member against rotation relative to said base, respectively, said winding member including a shaft portion generally coinciding with the axis of rotation of said winding member and upon which said second abutment means is directly guidingly supported for movement between said first and second positions, said shaft portion and said second abutment means including coacting cam surfaces thereon directly engageable with each other and operable in response to rapid acceleration of rotational speed of said winding member in one direction of rotation thereof, to cam said second abutment means toward said second position.

2. In combination, a base, a winding member journaled from said base, said base and winding member including coacting lock means, said coacting lock means including first abutment means carried by said base and second abutment means carried by said winding member for rotation therewith and for limited shifting relative thereto between first and second positions out of and in position for engagement with said first abutment means to lock said winding member against rotation relative to said base, respectively, said winding member and said second abutment means being operable in response to rapid acceleration of rotational speed of said winding member in one direction of rotation thereof, to shift said second abutment means toward said second position, said winding member including a shaft portion generally coinciding with the axis of rotation of said winding member and which is non-circular in configuration, said second abutment means including an abutment member having a slot formed therein mounted on said shaft portion for rotation therewith, and with said abutment member being slidable relative to said shaft portion transversely of the latter between said first and second positions, said shaft portion and said slot, upon rapid acceleration of rotational speed of said winding member in said one direction, including coacting cam surface portions operable to cam said abutment member from said first position, with said shaft portion disclosed in one end portion of said slot, to said second position, with said shaft portion disposed in the other end portion of said slot, said first abutment means including coacting portions of said frame with which said abutment member is engageable upon movement of said abutment member from said first position thereof to said second position thereof, and operable, when engaged, by said abutment member, to lock the winding member against further rotation in said one direction.

3. The combination of claim 2 wherein said abutment member is eccentrically weighted in a manner such that rapid rotation of said winding member will cause centrifugal forces to shift said abutment member toward said second position.

4. The combination of claim 1 wherein said coacting means also includes means, operative in response to rotation of said winding member in said one direction at a speed greater than a predetermined speed, to shift said second abutment means toward said second position.

5. The combination of claim 1 including means operatively connected between said winding member and said second abutment means yieldingly urging the latter toward said first position.

6. In combination, a base, a winding member journaled from said base and including a generally coaxial shaft portion, said base and winding member including coacting lock means consisting of first abutment means carried by said base and second one-piece abutment means encircling and mounted on said shaft portion for rotation therewith and directly guidingly supported therefrom for limited shifting transversely of said shaft portion along an elongated path extending through said shaft portion between first and second positions with a portion of said second abutment means positioned out of and in position, respectively, for engagement with said first abutment means to lock said winding member against rotation relative to said base, said shaft portion and said second abutment means each including coacting cam surface means, said cam surface means being engageable with each other and operative in response to torque above a predetermined value being applied to said second abutment means through said shaft portion in one direction of rotation thereof, to shift said second abutment means from said first position to said second position.

7. The combination of claim 6 including means operatively connected between said winding member and said second abutment means yieldingly urging the latter toward said first position.

8. In combination, a base, a winding member journaled from said base and including a generally coaxial shaft portion, said base and winding member including coacting lock means consisting of first abutment means carried by said base and second abutment means completely encircling and mounted on and supported directly from said shaft portion for rotation therewith and guided limited shifting transversely thereof between first and second positions with a portion of said second abutment means positioned out of and in position, respectively, for engagement with said first abutment means to lock said winding member against rotation relative to said base, said shaft portion and second abutment means including cam surface means engageable with each other and operative, in response to torque above a predetermined value being applied to said second abutment means through said shaft portion in one direction of rotation thereof and substantially independent of rotation of said second abutment means with said winding member relative to said base, to shift said second abutment means from said first position toward said second position.

9. The combination of claim 2 wherein said slot is arcuate and said shaft portion includes opposite side portions generally paralleling and closely adjacent the opposing sides of said slot.

10. A rotary lock assembly comprising a base including first abutment means, shaft means journalled from said base, a single movable locking component defining second abutment means mounted on said shaft means for rotation therewith and supported therefrom for guided limited shifting transversely of the axis of rotation of the shaft means relative to the latter and between said first and second positions with a portion of said second abutment means positioned out of and in position, respectively, for engagement with said first abutment means to lock said shaft means against rotation relative to said base, said shaft means and said single movable component including cam surface means engageable with each other and operative, in response to torque above a predetermined value being applied to said single movable component through said shaft means in one direction of rotation thereof and substantially independent of rotation of the single movable component with said shaft means relative to said base, to shift said single movable component from said first position toward said second position.

References Cited
UNITED STATES PATENTS

| | | |
|---|---|---|
| 700,763 | 5/1902 | Ham. |
| 888,418 | 5/1908 | Burdon. |
| 1,393,570 | 10/1921 | Ricketts. |
| 2,708,555 | 5/1955 | Heinemann et al. |
| 2,979,282 | 4/1961 | Barecki. |
| 3,206,137 | 9/1965 | Snyderman. |
| 3,214,218 | 10/1965 | Gill. |
| 3,323,749 | 6/1967 | Karlsson _____ 242—107.4 |
| 2,105,469 | 1/1938 | Bosch _____ 242—107.7 |
| 2,843,335 | 7/1958 | Hoven et al. _____ 242—107.4 |
| 3,058,687 | 10/1962 | Bentley _____ 242—107.4 |
| 3,190,579 | 6/1965 | Spouge et al. _____ 242—107.4 |

WILLIAM S. BURDEN, *Primary Examiner.*